Patented Aug. 18, 1953

2,649,420

UNITED STATES PATENT OFFICE 2,649,420

PREPARATION OF BARIUM-CHROMIUM-COPPER-SILICA-CONTAINING CATALYST

Alexander F. MacLean, Robstown, Tex., assignor to Celanese Corporation of America, a corporation of Delaware No Drawing. Original application December 8, 1948, Serial No. 64,230. Divided and this application December 10, 1949, Serial No. 132,417

3 Claims. (Cl. 252—457)

1

This invention relates to the dehydrogenation of alcohols to form carbonyl compounds, and relates more particularly to the vapor phase dehydrogenation of alcohols to aldehydes or ketones.

This application is a division of my application S. No. 64,230 filed December 8, 1948, now abandoned.

An object of this invention is to provide an improved catalyst for use in the vapor phase dehydrogenation of alcohols to aldehydes or ketones.

Another object of this invention is the provision of an improved catalyst capable of use in fluidized form in the catalytic dehydrogenation of alcohols to aldehydes or ketones.

Yet another object of this invention is the provision of an alcohol dehydrogenation catalyst which may be employed in a fluidized state and which is highly resistant to attrition and deactivation.

A further object of this invention is the provision of an improved process for the catalytic vapor phase dehydrogenation of alcohols to aldehydes or ketones wherein the dehydrogenation catalyst is employed in a fluidized state.

Other objects of this invention will appear from the following detailed description.

The vapor phase catalytic dehydrogenation of organic compounds is a well-known reaction and one which is widely employed commercially. The various types of organic compounds which may be dehydrogenated and the most efficient catalysts for the various chemical reactions involved have been the subject of a substantial amount of research and constitute a major field of investigation in catalysis. The vapor phase catalytic dehydrogenation of primary alcohols has been shown to yield the corresponding aldehyde, while the vapor phase dehydrogenation of secondary alcohols yields the corresponding ketone. The reaction is a reversible one and those catalysts which have a dehydrogenation effect also serve as hydrogenation catalysts under certain conditions. In addition, it has also been found that many catalysts which may be employed for dehydrogenation are not specific for said reaction and also exhibit a tendency to act as dehydration catalysts causing undesirable side-reactions. The dehydrogenation catalysts employed heretofore have been utilized in the form of a fixed bed. The use of a fixed catalyst bed makes temperature control somewhat difficult and frequently leads to excessive decomposition and dehydration.

I have now found that the catalytic vapor phase

2 dehydrogenation of alcohols to aldehydes or ketones may be effected with a high degree of efficiency if the reaction is effected in the presence of a fluidized catalyst. Particularly advantageous results are obtained when the fluidized catalyst employed comprises a novel composition consisting of discrete particles of silica gel having the bulk impregnated with a mixture of the oxides of copper, chromium and barium. The use of such a catalyst in a fluidized state permits of excellent temperature control, high conversion and an increased efficiency of conversion of the alcohol undergoing dehydrogenation to the desired aldehyde or ketone. In addition, I have found that the novel catalyst of my invention is highly resistant physically to attrition when fluidized and circulated in the reaction vapor stream and is capable of dehydrogenating substantial amounts of alcohols before it is deactivated.

The novel catalyst which I employ is prepared conveniently by impregnating silica gel of a particle size capable of passing through a screen of from about 50 mesh up to about 200 mesh with an aqueous solution containing water-soluble compounds of copper, chromium, and barium, drying the impregnated silica gel particles and then heating the dried particles in air or hydrogen to a temperature of 500 to 800° F. The heating converts the soluble metal compounds to their corresponding oxides and produces an activated catalyst. Some degree of conversion of the metal compounds to the free metal state is effected particularly if the catalyst is activated by being heated with hydrogen. The easily reduced metal oxides, such as copper oxide, exist as the free metal, while the others remain as the oxides.

Preferably, the aqueous solution employed for impregnating the silica gel particles is prepared by adding from about 2 to 5 parts by weight of barium acetate to 100 parts by weight of water, and then adding about 2 to 5 parts by weight of chromium acetate and 10 to 20 parts by weight of copper acetate to the solution obtained. About 100 to 200 parts by weight of silica gel particles of the desired 50 to 200 mesh size are wetted with the resulting solution, the slurry obtained is then filtered and the impregnated silica gel particles dried. The dried particles have no dehydrogenating action until heated in the presence of air or hydrogen to a temperature of 400 to 800° F. Heating for 1 to 2 hours in air or hydrogen converts the metal salts to the corresponding metal oxides or metals, as indicated, and produces an activated catalyst. The catalyst comprises finely-divided particles of silica gel having a mixture of 0.5 to 1% by weight of barium oxide, 0.5 to 1% by weight of chromium oxide and 2 to 5% by weight of cupric oxide or copper metal impregnated therein. The heating is preferably effected while the silica gel particles are in a fluidized state, the stream of air or hydrogen in which said particles are heated being of a velocity sufficient to maintain the latter in a gas-borne, fluidized state while being activated.

In carrying out the dehydrogenation reaction, the alcohol to be dehydrogenated is vaporized, mixed with about ½ to 3 mols of water in the form of steam and, if desired, 0 to ½ mole of oxygen, as air, for each mol of alcohol vaporized, the vapor mixture obtained heated to 212 to 800° F., but preferably 400 to 800° F. and passed through a suitable reactor containing the finely-divided, activated catalyst particles. The vaporized mixture of alcohol, steam and air is passed through the reactor at a velocity sufficient to maintain the vapors in contact with the catalyst for about ½ to 10 seconds.

When air is employed as a component of the reaction mixture, the relatively small amount of oxygen thus introduced causes a partial combustion of hydrogen and the heat liberated aids in maintaining the desired reaction temperature since the dehydrogenation reaction is highly endothermic. Where no air is employed it is necessary to preheat the vapor mixture undergoing reaction as well as the reactor itself to supply the necessary heat of reaction. The use of a small amount of steam as a diluent is also highly advantageous since it inhibits side reactions such as dehydration. The pressure under which the reaction is effected is preferably normal, atmospheric pressure or a pressure below normal atmospheric pressure. Lower pressures favor dehydrogenation. Preferably, a space velocity of 10 to 100 is employed in effecting said catalytic dehydrogenation and the velocity of the vapor mixture through the reactor maintains the catalyst particles in a fluidized condition. The space velocity is defined as the ratio of the volume of vaporized reactant passed through the reactor to the volume of catalyst in the reactor per minute, the vapor volume being calculated under conditions of normal temperature and pressure, i. e. 20° C. and 760 mm. pressure and the catalyst volume being the volume of a static bed.

The mixture of vaporized reaction products which is obtained by my novel process is separated in the reactor from the catalyst particles, employing suitable separating means present therein and the catalyst-free vapors then cooled by passage through a heat exchanger. The cooled mixture of reaction products is then passed through water where the aldehydes or ketones and other products present are absorbed in the water together with any unreacted alcohol. The aqueous solution is then separated into its several components by suitable distillation operations. The hydrogen which is formed as a by-product of the reaction may be recovered and the inert gases remaining are vented. Conversions per pass of up to 94% with efficiencies of up to 99% to the desired carbonyl compound are obtained using pure isopropanol. Lower conversions and efficiencies are obtained with normal alcohols. The conversion per pass may be defined as that portion of the reaction mixture which undergoes reaction during a single pass through the reactor while the efficiency is defined as that amount of the reacted material which forms the desired product.

In order further to illustrate my invention, but without being limited thereto, the following examples are given:

Example I

The dehydrogenation catalyst which I employ is prepared in the following manner: 20 parts by weight of barium hydroxide, Ba(OH)$_2$.8H$_2$O, are added to 300 parts by weight of hot water and 200 parts by weight of 80 mesh silica gel particles are added thereto. The resulting slurry is neutralized with acetic acid, 20 parts by weight of chromium acetate,

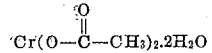

and 40 parts by weight of cupric acetate

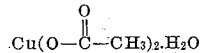

are added thereto and, after mixing thoroughly, the mixture is filtered and dried and the impregnated particles are placed in a suitable vessel where they are heated to a temperature of 600 to 700° F. for 1 to 2 hours in a stream of air or hydrogen which is forced through the vessel at a velocity sufficient to fluidize the particles. The activated catalyst obtained comprises particles of silica gel having on the surfaces thereof about 1% by weight of barium oxide, 1% by weight of chromium oxide and 2% by weight of cupric oxide or copper metal. When hydrogen is used, metallic copper is present, while heating in air produces the oxide.

Example II

Propyl alcohol containing a small amount of secondary butyl alcohol is vaporized and mixed with steam and air in such ratio that the mixture contains 7.27 mols of steam and 2.38 mols of oxygen, as air, for each mol of vaporized propyl alcohol. The vapor mixture is heated to a temperature of 624° F. and passed into a heated reactor containing the impregnated silica gel catalyst prepared in accordance with Example I. The volume of vapor mixture passed into the reactor is sufficient to maintain a space velocity of about 43.6. The finely-divided catalyst is fluidized and circulated through the reactor together with the moving vapors. The dimensions of the reactor are such that the vapors remain in contact with the fluidized, circulating catalyst for about 0.8 second before leaving the reactor. The reaction products are separated from the catalyst particles by means of a suitable separator. The vaporized reaction mixture free of catalyst particles leaves the reactor at a temperature of about 590° F. The catalytic dehydrogenation of propyl alcohol is effected with a conversion of 50.4% and an efficiency of conversion to propionaldehyde of 94.9%. The secondary butyl alcohol is converted to methyl ethyl ketone.

Example III

Isopropyl alcohol is vaporized and mixed with steam in such ratio that the mixture contains 0.5 mol of steam for each mol of vaporized isopropyl alcohol. The vapor mixture is heated to a temperature of 422° F. and passed into a heated reactor containing the impregnated silica gel catalyst prepared in accordance with Example I. The volume of vapor passed into the reactor is adjusted to maintain a space velocity of 19.8.

The vapor steam fluidizes the catalyst particles and the vapors are maintained in contact with the fluidized catalyst particles for about 1.3 seconds under the conditions of space velocity maintained. The catalyst particles are separated from the reaction vapors by means of a cyclone separator which forms a part of the reactor. The vapors from which the catalyst particles have been removed leave the reactor at a temperature of about 450° F. A conversion of the isopropyl alcohol of 77% is attained and an efficiency of conversion of 91% to acetone.

It is to be understood that the foregoing detailed description is given merely by way of illustration and that many variations may be made therein without departing from the spirit of my invention.

Having described my invention, what I desire to secure by Letters Patent is:

1. Process for the production of an improved dehydrogenation catalyst, which comprises adding about 200 parts by weight of finely-divided silica gel to a solution of 20 parts by weight of barium hydroxide in 300 parts by weight of water, neutralizing the solution with acetic acid, adding about 20 parts by weight of chromium acetate and 40 parts by weight of cupric acetate to the solution, mixing thoroughly, filtering the impregnated silica gel particles therefrom and heating the particles to a temperature of 400 to 800° F. for 1 to 2 hours, whereby finely-divided discrete particles of the hydrogenation catalyst are produced.

2. Process for the production of an improved dehydrogenation catalyst, which comprises adding about 200 parts by weight of finely-divided silica gel to a saturated solution of 20 parts by weight of barium hydroxide in 300 parts by weight of water, neutralizing the solution with acetic acid, adding about 20 parts by weight of chromium acetate and 40 parts by weight of cupric acetate to the solution, mixing thoroughly, filtering the impregnated silica gel particles therefrom and heating the particles in a stream of air to a temperature of 400 to 800° F. for 1 to 2 hours, whereby finely-divided, discrete particles of the hydrogenation catalyst are produced.

3. Process for the production of an improved dehydrogenation catalyst, which comprises adding about 200 parts by weight of finely-divided silica gel to a saturated solution of 20 parts by weight of barium hydroxide in 300 parts by weight of water, neutralizing the solution with acetic acid, adding about 20 parts by weight of chromium acetate and 40 parts by weight of cupric acetate to the solution, mixing thoroughly, filtering the impregnated silica gel particles therefrom and heating the particles in a stream of hydrogen to a temperature of 400 to 800° F. for 1 to 2 hours, whereby finely-divided, discrete particles of the hydrogenation catalyst are produced.

ALEXANDER F. MacLEAN.

References Cited in the file of this patent

UNITED STATES PATENTS

| Number | Name | Date |
| --- | --- | --- |
| 1,883,443 | Al | Oct. 18, 1932 |
| 2,137,407 | Lazier | Nov. 22, 1938 |
| 2,218,457 | Winans | Oct. 15, 1940 |
| 2,401,246 | Hull | May 28, 1946 |
| 2,546,031 | Hanson | May 20, 1951 |